United States Patent
Yamazaki et al.

(10) Patent No.: US 6,958,082 B2
(45) Date of Patent: Oct. 25, 2005

(54) POLISHING FILM AND METHOD OF PRODUCING SAME

(75) Inventors: Toru Yamazaki, Tokyo (JP); Tetsuya Baba, Tokyo (JP); Osamu Murata, Tokyo (JP)

(73) Assignees: Nihon Microcoating Co., Ltd., Tokyo (JP); NTT Advanced Technology Co., Ltd., Tokyo (JP)

(*) Notice: Subject to any disclaimer, the term of this patent is extended or adjusted under 35 U.S.C. 154(b) by 0 days.

(21) Appl. No.: 10/372,598

(22) Filed: Feb. 21, 2003

(65) Prior Publication Data
US 2004/0005460 A1 Jan. 8, 2004

(30) Foreign Application Priority Data
May 14, 2001 (JP) ......................................... 2001-180823

(51) Int. Cl.⁷ .............................. B24B 3/00; B24D 3/34; B24D 11/00
(52) U.S. Cl. .................... 51/298; 427/372.2; 427/397.7; 427/385.5
(58) Field of Search .................... 51/298, 308; 428/143, 428/141, 145; 427/372.2, 397.7, 385.5

(56) References Cited

U.S. PATENT DOCUMENTS

| | | | | | |
|---|---|---|---|---|---|
| 4,044,185 | A | * | 8/1977 | McCaskey, Jr. et al. | .... 428/153 |
| 5,766,277 | A | * | 6/1998 | DeVoe et al. | .................. 51/295 |
| 5,942,015 | A | * | 8/1999 | Culler et al. | ................... 51/295 |

* cited by examiner

Primary Examiner—Michael Marcheschi
(74) Attorney, Agent, or Firm—Beyer Weaver & Thomas LLP

(57) ABSTRACT

A polishing film includes a plastic film and a polishing layer formed on its surface, having a mixture of a first group of silica particles with a first average diameter and a second group of silica particles with a second average diameter fixed in a resin binder, the first average diameter and the second diameter being different from each other and both within a range of 0.001–10 μm. The mixture of the two groups of silica particles has a granularity distribution curve with two peaks at two different diameter values corresponding to the first and second average diameters.

1 Claim, 5 Drawing Sheets

POLISHING FILM AND METHOD OF PRODUCING SAME

This application claims priority on Japanese patent application 2001-180823 filed May 14, 2001 through PCT application PCT/JP02/04275 filed Apr. 26, 2002.

BACKGROUND OF THE INVENTION

This invention relates to a polishing film for use in polishing the surface of materials such as metals, ceramics, plastics and glass as well as to a method of producing such a film. More particularly, this invention relates to a polishing film for the surface finishing of precision instruments such as optical fiber connectors for communications, color filters for liquid crystal displays, optical lenses, magnetic disk substrates and semiconductor wafers that require a very high degree of surface smoothness, as well as a method of producing such a polishing film.

If there are unwanted scratch marks or protrusions on the surface of such an instrument requiring a high degree of smoothness, the instrument may cease to be able to function as expected according to its design. Thus, the final polishing is a very important step that controls the functions of such a precision instrument. For example, optical fibers for communications are coming to be commonly used as communication lines instead of the traditional copper wires, and they are usually connected by means of connectors. Such optical fiber connectors are formed by passing one or more optical fibers through the center of a ferrule made of partially stabilized zirconia obtained by adding aluminum to yttria and adhesively attached to the ferrule by means of a resin adhesive but their end surface must undergo a final surface polishing process such that the end parts of the optical fibers will not protrude by more than 0.1 $\mu$m or indent by more than 0.05 $\mu$m from the end surface of the connector. If there is left at the end part of the optical fibers a damage or a left-over adhesive spilled out of the gap with the ferrule, or if the end part of the optical fibers is polished excessively and becomes deformed, furthermore, scattering of light and other phenomena take place at the end part of the optical fibers and the transmission characteristics of the communication system as a whole come to frustrate the original design. Thus, the end part of such optical fibers must be smoothed to a high level of precision.

For the finishing of the end part of optical fibers and the polishing of surfaces of other precision instruments, it has been known to use a polishing tape having a polishing layer of abrading particles (very small spherical silica particles with average diameter of 0.001–0.5 $\mu$m) and a resin binder formed on the surface of a plastic film either in the form of a tape or by cutting into another shape, as disclosed, for example, in Japanese Patent Publications Tokkai 11-333731 and 11-333732.

The surface smoothness of a precision-requiring component can be improved by using such abrading particles with very small diameters so as to increase the contact surface of individual particles that act on the surface to be polished. Since the polishing layer is extremely flat, however, there arises the problem of lowered polishing capability such that the throughput is adversely affected and locally unpolished spots are left.

The polishing power can be increased while using abrading particles with such very small diameters if the content of silica particles inside the polishing layer is increased such that the number of abrading particles per unit area contacting the target surface to be polished is increased. This, however, causes the contact area of the resin binder inside the polishing layer to be reduced, and this tends to cause the polishing layer to peel off locally during a polishing operation. Such peeled-off portions of the polishing layer tend to damage the surface of the precision instrument, frustrating the effort to carry out a precise surface finishing process.

The polishing power can be increased also if relatively larger abrading particles are used. If the diameters of the abrading particles are increased, however, the contact area of the resin binder in the polishing layer with the plastic film increases and hence the problem of the polishing layer locally peeling off the plastic film can be alleviated but there arises instead the problem that the smoothness of the polished surface of the precision instrument is adversely affected.

As explained above, the smoothness of the polished surface of a precision instrument, the polishing power and the phenomenon of the polishing layer peeling off the plastic film are all dependent heavily on the size of the abrading particles. Thus, the selection of the size of abrading particles is an important problem in the technical field of surface finishing of a precision instrument.

SUMMARY OF THE INVENTION

In view of the above, it is an object of this invention to provide a polishing film capable of smoothly finishing the surface of a precision instrument without leaving any localized unpolished spots.

It is another object of this invention to provide a method of producing such a polishing film.

A polishing film embodying this invention, with which the above and other objects can be accomplished may be characterized as comprising a plastic film and a polishing layer formed on its surface, having a mixture of a first group of silica particles with a first average diameter and a second group of silica particles with a second average diameter fixed in a resin binder wherein the first average diameter and the second diameter are different from each other and both within a range of 0.001–10 $\mu$m.

The mixture of the two groups of silica particles according to this invention has a granularity (grain size) distribution curve with two peaks at two different diameter values corresponding to the first and second average diameters. In other words, silica particles having two different diameters contribute mainly to the polishing and the surface being polished therewith can be made into a smoothly finished surface with a high level of precision and without unpolished spots due to a synergistic effect of these particles, unlike the conventional polishing films in which only particles with only one particular diameter mainly contribute to the polishing.

For polishing the end surface of an optical fiber connector, it is preferred to use a polishing film using a mixture of a group of silica particles with average diameter of 0.02 $\mu$m and another group of silica particles with average diameter of 0.03 $\mu$m at a ratio of 9:1–6:4.

A method of producing a polishing film according to this invention may be characterized as comprising the steps of applying on a surface of a plastic film a paint obtained by dispersing in a resin binder solution a mixture of silica particles as described above and drying it to form a polishing layer on the surface of the plastic film. In this method, it is preferred to use a resin binder solution of a kind containing oligomers with siloxane bonds to form a network of cracks on the surface of the polishing layer.

This invention therefore provides a polishing film in which silica particles with two different diameters contribute to the polishing process and their synergistic effect makes it possible to obtain a smoothly polished surface without unpolished spots. Moreover, since silica particles with a relatively large diameter are fixed in the polishing layer, the polishing layer does not peel off easily from the plastic film while being used in a polishing process.

DETAILED DESCRIPTION OF THE INVENTION

Figure 1A:
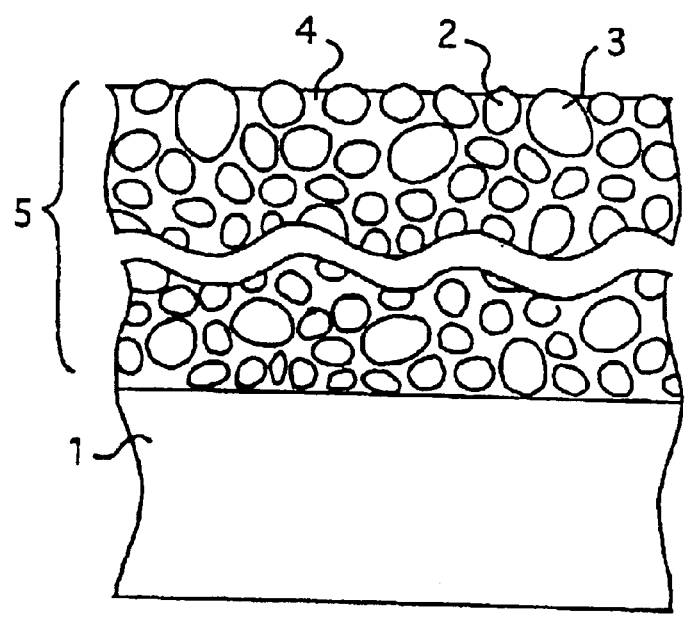
FIG. 1(a) is a schematic sectional view of a polishing film embodying this invention.
Figure 7:
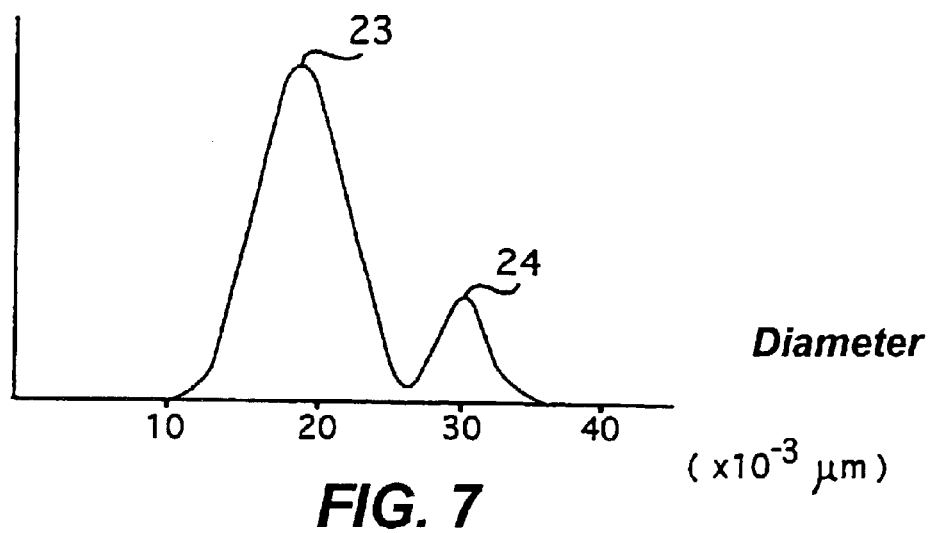
FIG. 7 is a granularity distribution of the mixture of a group of silica particles with average diameter of 0.02 μm and another group of silica particles with average diameter of 0.03 μm of the test example.

FIG. 1(a) shows a polishing film embodying this invention, having a polishing layer 5 formed on the front surface of a plastic film 1. The polishing layer 5 is formed by fixing a mixture of a first group of silica particles 2 and a second group of silica particles 3 with a resin binder 4 where the silica particles 2 of the first group has a (first) average diameter in the range of 0.001–10 μm and the silica particles 3 of the second group has a different (second) average diameter also in the same range. FIG. 7 shows the granularity distribution curve of the diameters of this mixture of silica particles, showing two peaks 23 and 24 corresponding to the two different average diameter values for the first and second groups of silica particles 2 and 3.

In general, the granularity distribution of particles is obtained by taking electron microscopic photographs at several arbitrarily selected parts of the particles, counting the number of particles in each range of their diameters and showing the result of the counting in a graph with the particle diameter shown along the horizontal axis and the number or percentage of particles along the vertical axis. The average diameter means where the peak appears on the distribution curve. Particles with the average diameter are most numerously contained and such particles having the average diameter mainly contribute in the polishing process.

Figure 5:
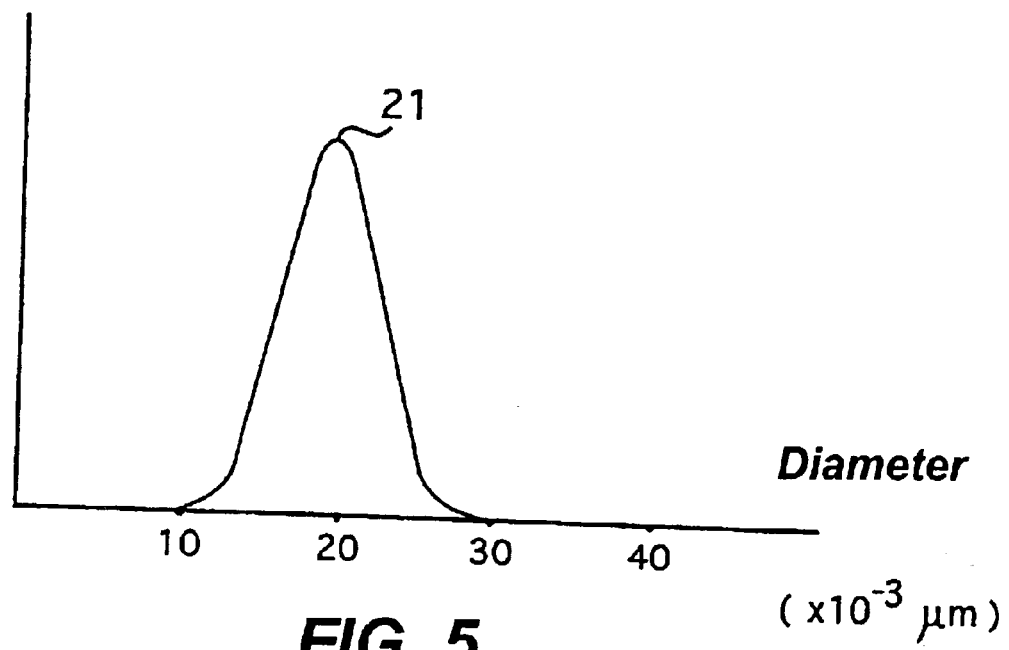
FIG. 5 is a granularity distribution of silica particles with average diameter of 0.02 μm.
Figure 6:
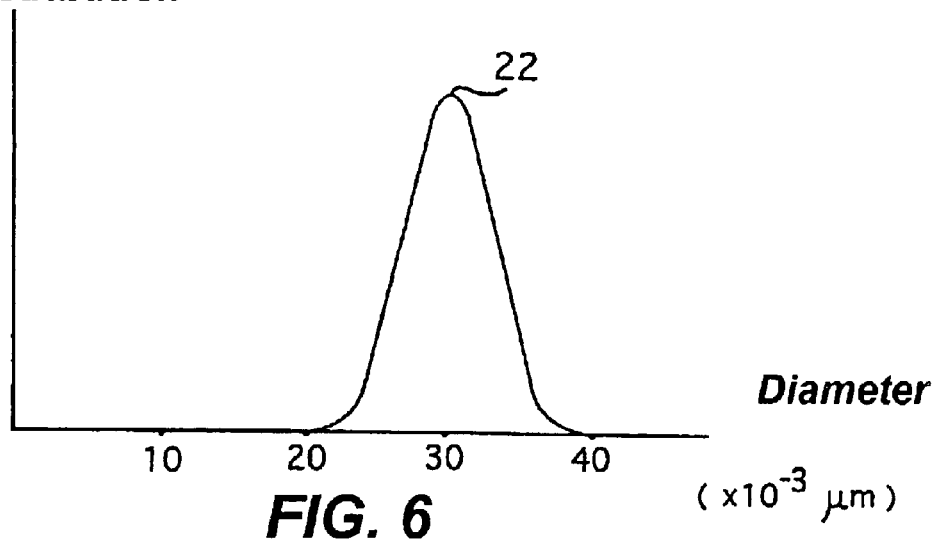
FIG. 6 is a granularity distribution of silica particles with average diameter of 0.03 μm.

Let us assume, for example, that the first average diameter for the first group of silica particles 2 is 0.02 μm and the second average diameter for the second group of silica particles 3 is 0.03 μm. With silica particles of the first group alone, the distribution curve may be for example as shown in FIG. 5, having only one peak 21 at 0.02 μm and those silica particles with diameter 0.02 μm contribute mainly in a polishing process. With silica particles of the second group alone, the distribution curve may be for example as shown in FIG. 6, having only one peak 22 at 0.03 μm and those silica particles with diameter 0.03 μm contribute mainly in a polishing process. With a mixture of silica particles of both groups present, however, the distribution curve has two peaks 23 and 24 as shown in FIG. 7 at different diameter values 0.02 μm and 0.03 μm and silica particles having two different diameter values 0.02 μm and 0.03 μm contribute mainly in a polishing process. According to the present invention, in summary, silica particles of two different diameter values are caused to contribute mainly in a polishing process such that the target surface of a precision instrument can be finished into a smooth surface with a reduced number of unpolished spots by a synergistic effect of silica particles of two groups with different average diameters.

As an example of plastic film 1, use may be made of any known flexible plastic film of a known kind having a large tensile strength and a superior resistance against heat and chemicals such as films of polyethylene terephthalate (PET), polyester or polypropylene with thickness about 20–150 μm. In order to improve the adhesive force to the polishing layer, use may be made of those with a surface on which a primer processing of a known kind has been carried out.

The ratio of mixing silica particles of the first group and the second group 2 and 3 may be selected appropriately. If the mixing ratio of the group having the larger average diameter is increased, the polishing power is increased to leave fewer unpolished spots and the probability of the polishing layer 5 peeling off from the surface of the plastic film 1 becomes reduced.

When an end surface of an optical fiber connector is finished by polishing, for example, the mixing ratio of silica particles with the smaller average diameter with respect to those with the larger average diameter should preferably be in the range of 9:1–6:4. This is because the tip portion of optical fibers may sustain an unwanted damage or become deformed if the mixing ratio of silica particles with the larger average diameter exceeds 50%. The ratio of the particles with the larger average diameter may be less than that of the particles with the smaller average diameter.

Polishing films according to this invention may be produced by applying a paint material including aforementioned mixed particles and a binder on the surface of a plastic film and then drying it to thereby form a polishing layer on the surface of the plastic film. Examples of the binder which may be used for the purpose of this invention include conventional polyurethane and polyester resin binders of known kinds. Methylethyl ketone may be used as its solvent. A hardening agent such as isocyanate may be added to a mixture of a resin binder and a solvent. A mixture of a resin binder and a solvent (and perhaps also a hardening agent) will be hereinafter referred to as a "resin binder solution." The mixing ratio of the mixed particles with respect to the resin binder solution is within the range of 1:99–99:1

Figure 1B:
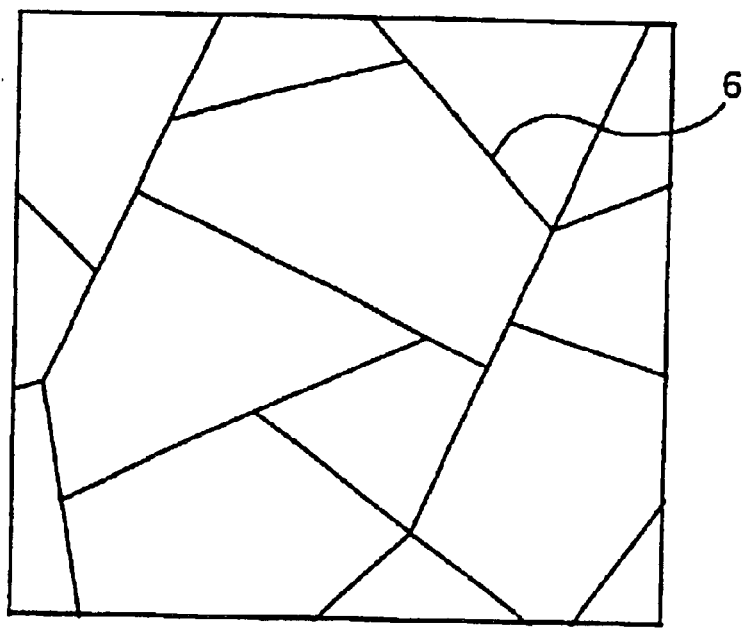
FIG. 1(b) is an enlarged plan view of a portion of the surface of its polishing layer.

Oligomers such polyurethanes and polyesters having a siloxane bond may be used conveniently to form a network of cracks 6 on the surface of the polishing layer 5 as shown in FIG. 1(b). These cracks 6 serve to take in waste materials generated during a polishing process such that the waste materials can be prevented from damaging the target surface being polished.

The invention is described next by way of test and comparison examples. A polishing film as a test example was prepared by using a mixture of silica particles of two groups with different average diameters of 0.02 μm and 0.03 μm and having a distribution curve as shown in FIG. 7 with two peaks at 0.02 μm and 0.03 μm. Explained more in detail, a liquid having silica particles with average diameter 0.02 μm dispersed therein (IPA-ST by tradename produced by Nissan Chemical Industries Corporation) (3150 g) and another liquid having silica particles with average diameter 0.03 μm dispersed therein (MA-ST-M by tradename produced by Nissan Chemical Industries Corporation) (1012.5 g) were placed inside a mixer and this mixed liquid with silica particles with different average diameters were mixed together for five minutes by stirring with ultrasonic waves. A resin binder solution comprising oligomers having siloxane bonds (KR-211 by tradename produced by Shinetsu Chemical Industries Corporation) (203.6 g) was gradually added thereafter and mixed together by stirring for five minutes with ultrasonic waves so as to uniformly disperse the mixed particles inside this resin binder solution. Next, another resin binder solution comprising oligomers having siloxane bonds (T8001 by tradename produced by JSR Corporation) (37.5 g) was gradually added and mixed together by stirring for 30 minutes with ultrasonic waves so as to uniformly disperse the mixed particles inside these resin binder solutions and to thereby obtain a paint.

After this paint was filtered through a 1.0 μm filter, it was uniformly applied over a surface of a PET film of thickness 75 μm in an atmosphere of about 20° C. by a gravure reverse coating method, and after it was dried so as to evaporate the solvent in the resin binder, it was further subjected to a heat process in an atmosphere of 100° C. to form a polishing layer of thickness 6 μm. In the above, the PET film was one obtained by extruding PET and polyester resin together and then subjecting the extrusion to a drawing process. In other words, use was made of a PET film with a primer processing carried out thereon. A network of cracks as shown in FIG. 1(b) was formed on the surface of this polishing layer.

For making a comparison with the test example described above, another polishing film of a comparison example was prepared, having silica particles with average diameter of 0.02 μm fixed in the same resin binder as used for the test example. FIG. 5 shows the granularity distribution of the silica particles, having a single peak at a diameter value (0.02 μm) corresponding to their average diameter 0.02 μm.

Explained more in detail, a liquid having silica particles with average diameter 0.02 μm dispersed therein (IPA-ST by tradename produced by Nissan Chemical Industries Corporation) (4500 g) was placed inside a mixer and this mixture was stirred together for five minutes with ultrasonic waves. Next, as done for the test example, a resin binder solution comprising oligomers having siloxane bonds (KR-211 by tradename produced by Shinetsu Chemical Industries Corporation) (203.6 g) was gradually added and stirred for five minutes with ultrasonic waves so as to uniformly disperse the siloxane particles inside this resin binder solution. Next, another resin binder solution comprising oligomers having siloxane bonds (T8001 by tradename produced by JSR Corporation) (37.5 g) was gradually added and mixed together by stirring for 30 minutes with ultrasonic waves so as to uniformly disperse the mixed particles inside these resin binder solutions and to thereby obtain a paint.

After this paint was filtered through a 1.0 μm filter, it was uniformly applied over a surface of a PET film of thickness 75 μm in an atmosphere of about 20° C. by a gravure reverse coating method, and after it was dried so as to evaporate the solvent in the resin binder, it was further subjected to a heat process in an atmosphere of 100° C. to form a polishing layer of thickness 6 μm, as done for the text example. A similar network of cracks as shown in FIG. 1(b) was formed on the surface of this polishing layer.

Figure 4:
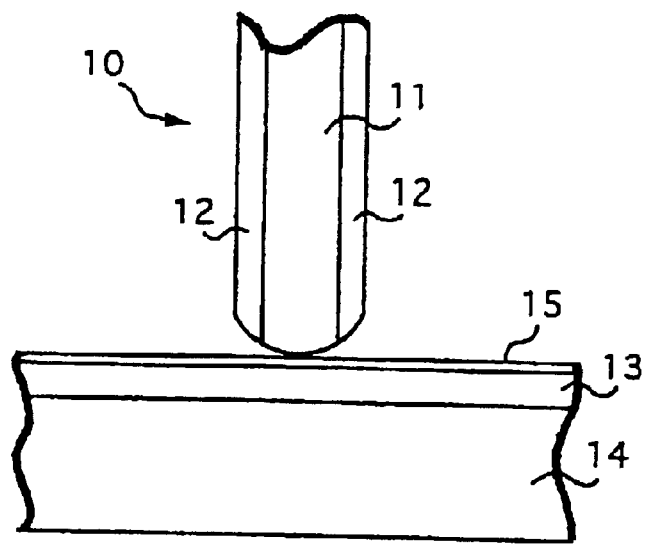
FIG. 4 is a schematic sectional view of an optical fiber connector having its end surface polished in the comparison experiment.

As a comparison experiment, each of the polishing films of the test and comparison examples was used to finish the end surface of an optical fiber connector 10 as shown in FIG. 4 composed of a communication optical glass fiber 11 penetrating and adhesively attached to a zirconium ferrule 12 preliminarily roughly polished by using a polishing liquid containing diamond particles and a non-woven cloth pad. The polishing was carried out as shown in FIG. 4 by pasting a polishing film 15 on a rotary disk 14 having an elastic pad 13 attached thereto and pressing the end surface of the optical fiber connector with a specified pressure while the disk 14 is rotated. The comparison experiment was carried out by rotating the disk 14 at the rate of 200 rpm and pressing each fiber optical connector at a pressure of 180 g per fiber for 4 minutes.

Figure 2A:
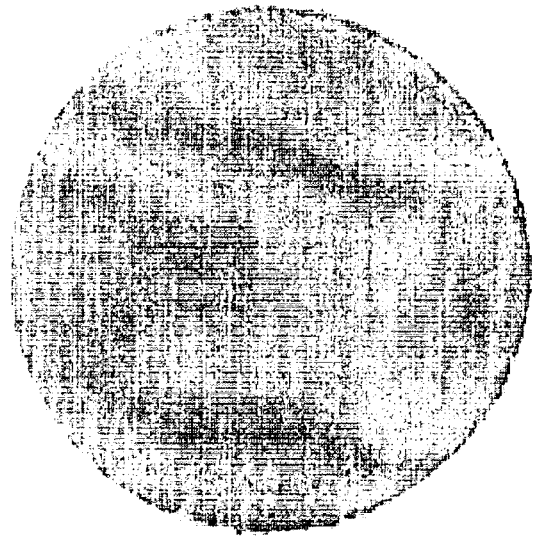
FIGS. 2(a) and 2(b) are optical microscopic photographs showing the condition of the end surface of an optical fiber connector respectively before and after it was polished by using a polishing film of the test example in the comparison experiment.
Figure 2B:
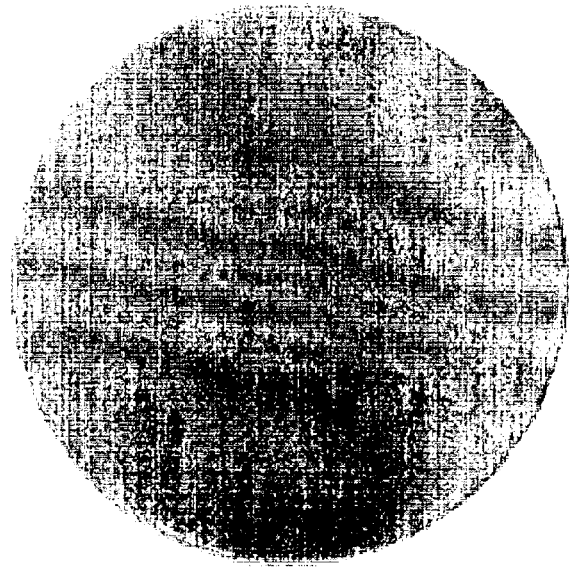
Figure 3A:
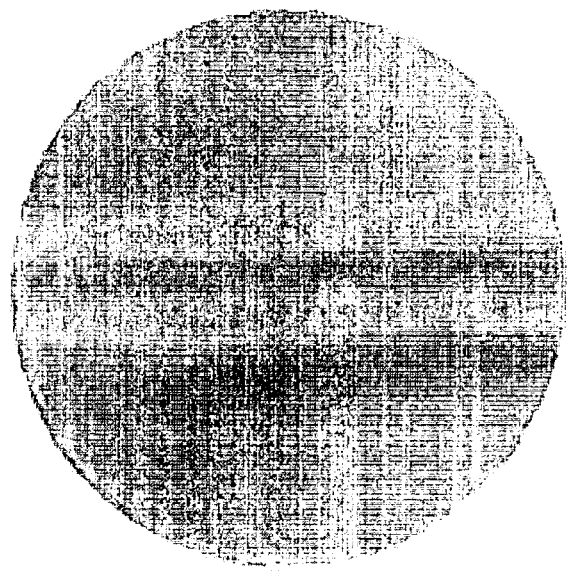
FIGS. 3(a) and 3(b) are optical microscopic photographs showing the condition of the end surface of an optical fiber connector respectively before and after it was polished by using a polishing film of the comparison test example in the comparison experiment.
Figure 3B:
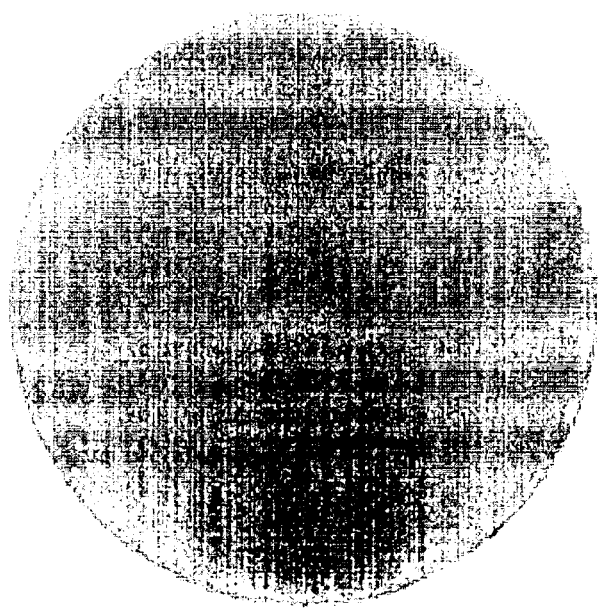

If a polishing film of the test example is used, as can be seen in the optical microscopic photographs shown in FIGS. 2(a) and 2(b) that the resin (the dark black portions around the circular black part) spilling out from between the optical fiber (the circular black part) and the ferrule (the white part outside the circular black part) visible before the finishing is removed and the end surface is polished smoothly with a high level of precision. If a polishing film of the comparison example is used, by contrast, as can be seen in the optical microscopic photographs shown in FIGS. 3(a) and 3(b) that the resin spilled out from between the optical fiber and the ferrule and visible before the finishing process is not removed and remains visible, there being unpolished spots left and a polishing with a high level of precision was not carried out.

What is claimed is:

1. A method of producing a polishing film for polishing end surface of an optical fiber connector, said method comprising the steps of:

applying a paint on a surface of a plastic film, said paint being obtained by dispersing in a resin binder solution including oligomers with siloxane bonds a mixture of a first group of silica particles with average diameter of 0.02 μm and a second group of silica particles with average diameter of 0.03 μm, wherein said mixture has a granularity distribution curve with two peaks at two different diameter values 0.02 μm and 0.03 μm;

drying said paint to form a polishing layer on said surface of said plastic film whereby said polishing film is produced; and thereafter forming on said surface of said plastic film by a heat treatment a polishing layer with a network of cracks on a surface thereof.

* * * * *